Jan. 25, 1966

J. R. WEST 3,230,695

SAFETY CONTROLS FOR AN ELECTRICAL POWERED LAWN MOWER

Original Filed July 31, 1957

INVENTOR
JOHN R. WEST

BY

ATTORNEYS

Jan. 25, 1966    J. R. WEST    3,230,695
SAFETY CONTROLS FOR AN ELECTRICAL POWERED LAWN MOWER
Original Filed July 31, 1957    5 Sheets-Sheet 3

INVENTOR
JOHN R. WEST

BY

ATTORNEYS

Jan. 25, 1966  J. R. WEST  3,230,695
SAFETY CONTROLS FOR AN ELECTRICAL POWERED LAWN MOWER
Original Filed July 31, 1957  5 Sheets-Sheet 4

INVENTOR
JOHN R. WEST

ATTORNEYS

INVENTOR
John R. West

ATTORNEYS

United States Patent Office 3,230,695
Patented Jan. 25, 1966

3,230,695
SAFETY CONTROLS FOR AN ELECTRICAL POWERED LAWN MOWER
John R. West, Marysville, Ohio, assignor to The O. M. Scott & Sons Company, Marysville, Ohio, a corporation of Ohio
Original application July 31, 1957, Ser. No. 675,331, now Patent No. 3,028,717, dated Apr. 10, 1962. Divided and this application July 19, 1961, Ser. No. 125,140
19 Claims. (Cl. 56—25.4)

This invention relates to control of power mowers and more particularly relates to construction of safety control mechanism and circuitry for electric motor powered mower cutting members for operator safety. This application is a division of co-pending application Serial No. 675,331 filed July 31, 1957 for Power Mower, now U.S. Patent No. 3,028,717.

Although the primary purpose of a lawn mower is to cut the grass, three other major factors (1) proper shearing of the grass blades to the height best adapted to promulgate healthy continued plant growth and automatic even distribution of the cuttings to prevent spot smothering of the plant life, (2) dependable machine functioning under existing operating conditions and (3) safety to the operator, should be considered and provided for in a mower offered to the public. With a dependable, rugged machine, which would accomplish the best possible results in lawn cutting with maximum safety to the operator as the final goal, this invention was conceived and, as specifically disclosed hereinafter, culminated in a powered rotary lawn mower embodying electric control circuitry with safety controls and automatic electric motor braking apparatus.

There are many inherent factors in previously known power mowers which have resulted in hazardous operating conditions.

Lawn mowers, being cutting devices, are dangerous if improperly used or if the high speed cutting members are improperly protected by safety devices. In many mowers on the market previous to this invention, the openings into the whirling blades are such that accidental injury can easily occur and has often occurred by inadvertently placing the foot or other body member into the openings or by inadvertently rolling or backing the mower over the foot or other body member. Prior electric mowers generally have the cord inseparably directly connected to the mower and, as far as is known, have an on-off switch on or adjacent to the handle to control motor operation, and thus present several added sources of danger. For example, the switch may be in an "on" position when the line is plugged to an electric source, in which case the blade will rotate unattended and is a source of danger to young children, pets and even older persons who may be unaware that the mower is connected to a source of power. Further, when the prior electric mowers are turned over for cleaning, the switch on the handle may inadvertently be knocked to "on" position possibly resulting in loss of hands or fingers. Many times a mower can "get away" from the operator if he slips or is thrown off balance, and this can occur very easily when cutting on a slope or a bank, resulting in an unattended mower with high speed rotating blades, rolling over the operator, or the mower tilting over and the operator falling into the upended rotating blade.

Because many mower manufacturers in the past have failed to give proper consideration to safety features, many people have been hurt and even suffered loss of parts of their bodies. While injury is often a result of their own carelessness, much of the injury attributed to carelessness was possible because the mower did not include proper safety features. Rotary mowers are considered too dangerous by some people because of such preventable accidents, the possibility of inadvertent starting, the dangerous long coasting period, upon shut down, of a rotary blade tip, which in many mowers is travelling at approximately 200 miles per hour, and accidental cutting of the power line. These objections, which do exist in previously known rotary mowers, particularly electric powered mowers, account for many persons being reluctant to accept rotary mowers or rotary electric mowers over reel type and rotary gasoline powered mowers.

The primary object of the present invention is to overcome the foregoing disadvantages in powered mowers and to adequately satisfy the criteria of safety which should be present in a power mower. This end has been accomplished through long and expensive research, testing, changes and development of new ideas correlated to maintenance requirements.

A further important object of this invention is to provide a novel mower, incorporating the features of the previous object, the resultant cost of which is maintained at a low value, acceptable and competitive to the existing market.

Another object of this invention is to provide an electric motor powered rotary mower with electric motor circuitry which includes two switches, both of which are spring biased to "off" position and both of which must be placed to "on" position to start a low speed, split phase capacitor start motor. A further object of the present invention resides in making one of the switches of the previous object the running switch, and incorporating it in a handle bar control that must always be manually held in "on" position to retain the motor in a running condition.

A still further object of the present invention is to incorporate in the running switch of the previous object a novel inexpensive combination regenerative-dynamic braking circuit effective upon release of the running switch to cause the blade to come to a dead stop in approximately three seconds which essentially eliminates the danger of a freely coasting rotary mower blade with a momentum derived from powered rotation at a rate of from 93 to 203 miles per hour depending upon motor speed and blade diameter.

Another object of the invention is to provide a motor powered mower with a motor housing designed to give maximum protection from rain, dust, dirt and clippings and provide a large volume airflow in through a cover baffle arrangement.

Still another object resides in providing a power mower with an electric drive motor and a novel control circuitry incorporating safety operating controls.

Another object resides in providing a novel electric motor, control circuit and control components enabling automatic regenerative-dynamic motor braking. Coextensive with this object there are provided various modified circuits and components that add or delete various safety features in a novel manner yet still retain the automatic regenerative-dynamic motor braking.

Still another object resides in providing an electrically powered mower with a novel combination of an electric induction motor having control components and circuitry enabling safety starting, stopping and overload factors by incorporating starting and running controls, and automatic regenerative-dynamic motor braking.

A further object resides in providing a novel combination of induction motor with a running switch, a capacitor, an auxiliary direct current source and circuitry enabling automatic regenerative (alternating current) braking of the motor in the high speed range and dynamic (direct current) braking of the motor in the low speed range whenever the running circuit is opened.

A still further object resides in providing a novel electric powered lawn mower having a body frame with a split phase capacitor start motor mounted on the frame and driving the mower blades, and a control for the motor that includes a dual switch starting circuit and single switch running circuit, an overload switch in the running circuit, a transformer, a selenium rectifier, and circuitry that provides automatic regenerative-dynamic braking whenever the running switch is opened during motor operation.

Another object resides in providing a novel electric mower embodying a low speed high torque motor and motor housing combination in which the motor is cooled by airflow through the motor as dictated by cooperative air flow deflecting structure on the motor, housing and body.

Another object resides in providing an electric powered mower with a novel handle having control for a running switch on the handle bar assembly and a safety starting switch adapted to be foot operated.

Further novel features and objects of this invention will become apparent from the following detailed descriptions and the appended claims taken in conjunction with the accompanying drawings showing a preferred embodiment thereof, in which:

*General*

Briefly, the disclosed exemplary embodiment (FIGURE 1) of a power mower 50 incorporating the safety control invention of this application has a body frame casting 52 supported on front and rear sets of wheels 54, the wheels in each set being conjointly adjustable to regulate the height at which the mower body is disposed above a lawn surface.

Figure 1:
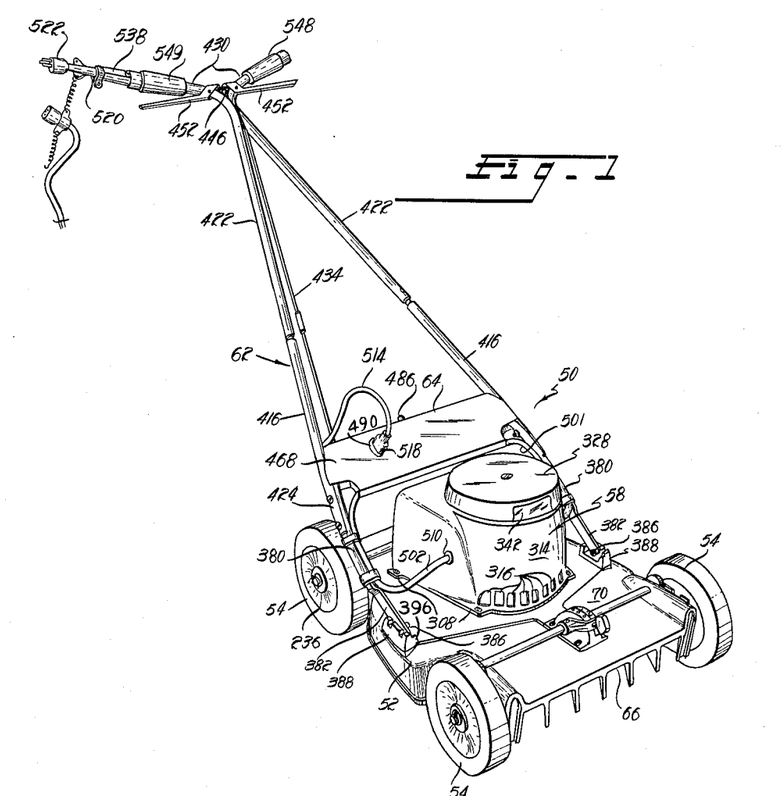
FIGURE 1 is a perspective view of a power mower embodying the safety control principles and objects of this invention.

A low speed electric motor 72 is mounted on top of the frame 52 within a housing with the motor shaft on a vertical axis and projecting below the frame. A diametral double rotary bladed cutter 60 is fastened to the motor shaft below the frame.

Operator safety is provided by frame design and the special motor 72 with its safety control circuit and components. In this control circuit, two switches are used and are required to be simultaneously actuated to start the motor. One is a running switch remaining under the operator's control by handle levers during operation and serves as a "deadman" switch. If for any reason the operator relinquishes control of the running switch, an automatic regenerative-dynamic braking circuit stops the motor within approximately three seconds.

*Specific description*

With reference to the drawings for specific details of the exemplary embodiment, FIGURE 1 illustrates an electric powered rotary blade mower 50 incorporating the various novel concepts of this invention. The same reference characters are used to designate identical parts through the drawings and in the specification.

Mower 50 includes a housing frame 52 with four wheels 54, an electric motor power assembly 56 enclosed by the motor housing 58 and a handle assembly 62 which carries a compact enclosed electric component panel assembly 64. Power for motor assembly 50 is supplied through electric components and circuitry which are enclosed in handle assembly 62, the electrical panel 64 and in the motor housing 58. These components are fully described hereinafter. Handle assembly 62 is pivotally secured to the housing 52 in a manner enabling handle assembly reversal so the mower 50 can be pushed in opposite directions and thus, there is no true front and rear ends of the mower. However, the housing 52 and motor housing 58 are designed to provide distinctive opposite end appearances and for clarity in this description the end 66 shown in FIGURE 1 will be considered the front.

Figure 2:
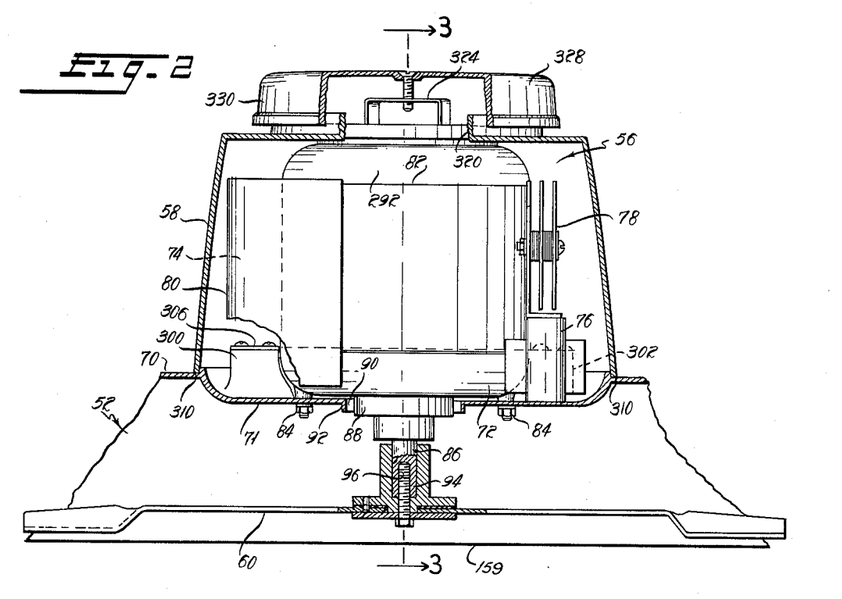
FIGURE 2 is a front vertical detail section view taken on line 2—2 of FIGURE 3 illustrating the motor mounting, its housing and the cutting blade.
Figure 3:
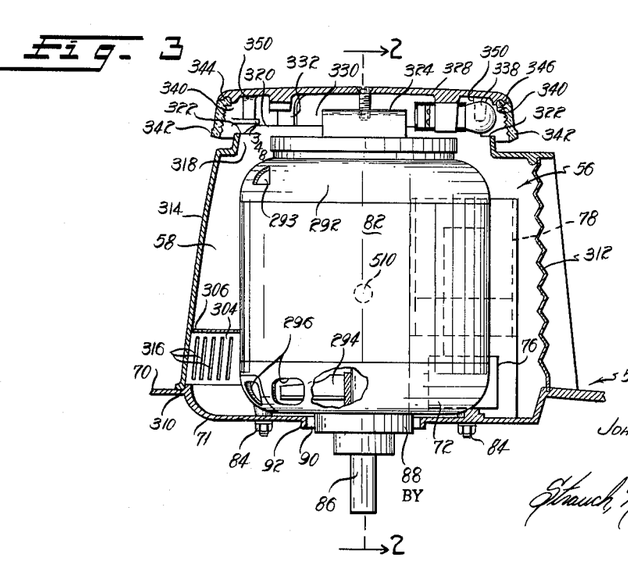
FIGURE 3 is a side vertical detail section taken on line 3—3 of FIGURE 2, illustrating further details of the electric motor, its housing and ventilation arrangement and the lights and lens construction in the housing cover.

Mower housing 52 is preferably made of cast metal, i.e., steel, aluminum, an alloy or the like and its upper wall 70 provides a rigid horizontal platform with a depressed area 71 to carry the motor assembly 56 which in turn carries the rotary cutter. Motor assembly 56, FIGURES 2 and 3, includes a capacitor type inductance motor 72, a capacitor 74, a transformer 76 and a dry plate rectifier 78. The capacitor 74 and its cover 80 are fastened to the motor center frame 82 and the motor 72 is centrally located and secured as by studs and nuts 84 in depression 71 on the top of the mower housing horizontal wall 70 with the axis of motor shaft 86 vertically disposed. A bearing boss 88 on the lower end bell of motor 72 projects into an opening 90 through the mower housing wall 70 which includes a narrow depending annular flange 92. There is but a slight clearance between boss 88 and the flange 92. The opening flange 92 serves as a barrier against debris passing from below the mower housing to the interior of the motor housing. The depressed sink 71 funnels any moisture, which may inadvertently enter the motor housing 58, to opening 90 thence to ground. Sink 71 also aids in heat dissipation from the motor housing 58 by providing an increased area over which air flow above the cutter 60 can pass. The lower end 94 of motor shaft 86 has a threaded blind bore 96 and projects from the motor through the mower housing opening 90 to a position below the mower housing horizontal wall 70.

The preferred revolutions per minute of motor 72 with a nineteen inch cutter is 1725 which provides an approximate 92 m.p.h. tip speed. The special motor provides sufficient power to handle the cutting job necessary.

*Motor housing and cooling*

Although the illustrated external shape of motor housing 58 is designed to give a pleasing appearance, other features of the housing, in cooperation with the mower housing 52 and the motor assembly 56, serve a functional purpose.

As has been described, motor 72 is secured on a depressed portion or sink 71 in mower housing wall 70 with its shaft axis in a vertical position. The upper motor casting bell 292 has openings 293 through which air can enter and pass through the motor stator and rotor, drawn by a fan 294 on motor shaft 86 in the lower bell of the motor and discharge out through forward openings 296 in the lower motor casing bell 72. Integral with and upstanding from the sink portion 71 of the mower housing upper wall closely adjacent the lower motor bell 72 and contoured to fit closely beside bell 72 on each side of the lower motor openings 296, are two vertical bosses 300 and 302 (FIGURE 2) which serve as end baffles for an air outlet passage 304. A curved deflector plate 306 is secured by screws to the tops of end bosses 300 and 302 and with the bosses 300 and 302 and the encompassed portion of mower housing upper wall 70 define the passage 304 which directs air flow from the lower end of motor bell 72.

The capacitor 74 is located behind one boss 300 and the transformer 76 and associated rectifier 78 are located behind the other boss 302. Motor housing 58 is placed over all components of the motor assembly 56 and has lower edge flanges 308 which are used to secure the motor housing to the mower housing 52 by means such as screws. The motor housing lower edge 310 fits over a ridge in the upper surface of the mower housing wall 70 and its rear wall 312 can be integral or it can be a separable sheet metal plate, corrugated if desired. The forward portion 314 of motor housing 58 is curved and its inner surface has a close fit with the outer edges of bosses 301 and 302 and with the deflector plate 306 to confine air flow through the passage 304 and out of the motor housing 58 through a bottom row of apertures 316.

An opening 318 in the top wall of housing 58 is coaxially disposed above the motor 72 and is surrounded by an annular upstanding flange 320, notches 322 being disposed at front and rear locations to provide clearance for light bulbs to be described. A bracket 324 is secured on the upper casing bell 292 and has a threaded center hole for attaching a motor housing cover 328. Cover 328 has an annular depending peripheral flange 330 of greater diameter than the upstanding motor housing flange 320. Integral support lugs 332 on the inside of cover 328 rest on housing flange 320 and maintain the spaced relationship between the cover 328 and housing 58 illustrated in FIGURE 7 when the cover is secured to motor bracket 324 by a screw 334. The cover flange 330 overhangs the housing flange 320, providing a baffled annular air inlet to the upper end of motor 72, which prevents entry of rain and effectively prevents entry of grass clippings and other debris.

Two lights are used on this mower and are mounted in the cover 328 to provide beams toward the front and rear of mower 50. The illustrated embodiment utilizes conventional bayonet base light bulbs 338, rated 6 to 8 volts, 21 candlepower connected through circuitry, to be later described, to transformer 76.

Two diametrically located cutouts 340 (FIGURE 3) in cover flange 330 provide for insertion of lenses 342, which for economy and ruggedness can be molded from clear hard plastic. Each lens 342 is shaped to fit snugly into a cover flange cutout 340 so the exterior lens surface provides a continuation of the exterior flange contour. A rib 344 on the upper edge of lens 342 fitting in a groove 346 in cover 328 and two integral lens ears 348 extending over and fastened by screws to associated bosses 350 depending from the inside of the cover 328 retain the lens in place.

Behind each lens 342 is a depending boss 370 integral with cover 328 and contoured to receive a light bulb socket 372 directed toward the associated lens. Each bulb socket 372 is secured on its boss 370 by a clamp 374 and screws.

*Handle assembly*

Handle assembly 62 is fabricated from several separable components and its basic framework consists essentially of tubular stock. The lower frame 376 is a single tubular member bent to provide a cross bar 378 with two side legs 380. Ends 382 of legs 380 are flattened and apertured to pivotally fit on studs 386 of handle brackets 388.

In this arrangement the edges of flat ends 382 can engage the upper edge of bracket end walls 396 to limit the pivotal movement of handle assembly 62 to either front or rear at a convenient operator height when pushing the mower in either direction.

The upper part of handle assembly 62 consists of two lower tubular members 416 with reduced diameter ends 418 telescoped into ends 420 of two upper tubular members 422. Lower ends 424 of the lower tubular members 416 are pressed together and curved to match the tubular contour of side legs 380 of the lower frame 376, and are secured to the side legs 380 by bolts and nuts 426. From the position of attachment to the lower frame 376, the two sets of lower and upper tubular members 416 and 422 converge to a position adjacent the upper extremity at which position the two upper members 422 are welded to a small cylindrical sleeve 428 which is aligned longitudinally of the handle assembly 62. Immediately above the welded sleeve 428, the ends 430 of upper tubular members 422 are bent in a divergent manner to provide handle bars.

The two upper members 422 being welded together become a rigid assembly and when the lower members 416 are telescoped into ends 420 and fastened thereto as by screws, and lower member ends 424 secured to the lower frame 376, a rugged, rigid handle assembly frame results.

*Handle bar control.*—Many prior devices which incorporates handle bar control utilize some type of control lever easily manipulated at the handle bar but such prior art devices have some complex linkage, wire or cable control. The following construction provides a positive handle bar lever control which is far superior to ordinary flexible wire or cable controls which can jam or twist and which are used on most power mowers for clutch, brake, throttle and other controls.

The handle bar lever control includes an adjustable rod 434 with a center turnbuckle 436, lower end 438 of rod 434 projecting through apertures 440 in the lower frame cross bar 378 and the upper end 442 passing in slidable relation through the previously described short sleeve 428 which is secured between upper tubular members 422. In the illustrated electric mower 50, rod 434 is used to operate a spring loaded switch, to be later described, and for apparent reasons is disposed to one side of the handle assembly center line, however the rod 434 can be formed to extend in other directions from adjacent the sleeve 428 by changing the bend 444. Rod upper end 442 is slidably guided by sleeve 428 so it will be disposed on the handle frame center line and is threaded to receive a flat head knob 446 and locking nut 448 above the sleeve 428. As will be described, the spring loaded switch biases rod 434 to an upper position, and the switch is actuated against the spring bias by pushing on knob 446. If the control requires any auxiliary spring bias, a compression spiral spring can be placed on the rod 434 between the upper end of sleeve 428 and the knob lock nut 448, as illustrated.

Similiar dual control levers 452 (FIGURE 4) are provided on each handle bar 430, either or both of which can be used to push the control rod 434 against spring bias by pulling the lever handle 454 toward the handle bar 430. Although levers 452 can be made of metal, it will be preferable considering safety factors on an electric mower to make them of non-conducting material such as plastic. Each lever 452 is an integral part, preferably molded including the handle 454 which terminates near the ends and between the lower edges of two side plates which are spaced apart a sufficient distance to enable a close free passage of the tubular handle member 422 between the lever plates. A cross plate joins the top edges and extends to the inner corners of side plates. Each lever 452 is assembled over its respective handle bar 430 to the position illustrated and pivotally secured to the upper tubular member 422 by a pin 460 which projects through both side plates and the tubular member 422 and is swaged over at each end. So assembled, the weight of lever handles 452 will cause levers 452 to hang by gravity in an inoperative position which is generally horizontal and determined by contact of an edge of the cross plate against the tubular member 422. The other edge of the cross plate extends over the flat edge portion of the actuating rod knob 446. The rod length can be adjusted by turnbuckle 436 so the spring biased position of knob 446 is slightly below lever cross plates when levers 452 are hanging free. When lever handles 454 are pulled up toward the handle bars 430 the cross plate is moved down to engage knob 446 and push the rod 434 down against spring bias to actuate the switch. The handle assembly per se was considered a divisible invention from the safety control apparatus and hence is described as an exemplary device utilized with the mower safety controls.

Figures 4, 9:
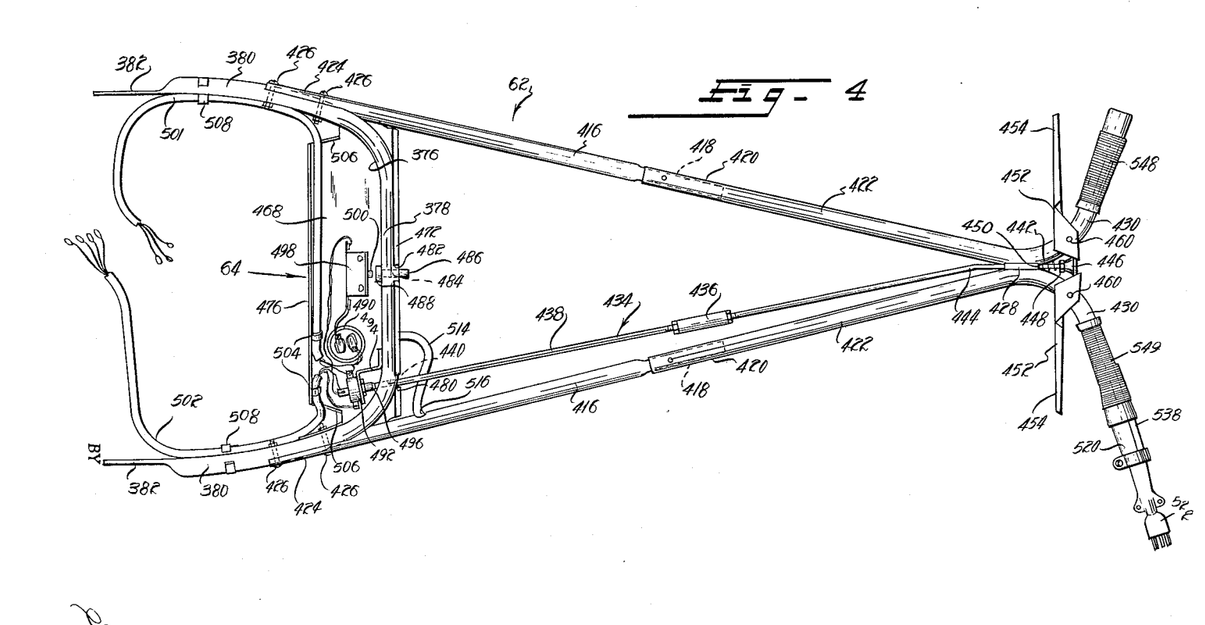
FIGURE 4 is a plan view of an assembled mower handle with a panel shroud removed to show electric control components and wiring disposition below the handle mid-bracket.

*Electrical panel.*—Three electrical circuit components are carried in a panel 64 situated on the lower handle frame 376 (see FIGURE 4). Panel 64 is an enclosure made of two similarly shaped shrouds 468 and 470 (see FIGURE 1) each having a top flange respectively 472, 474, and a bottom flange respectively, 476, 478. One shroud is omitted from FIGURE 4 to illustrate the mounted interior components. Shrouds 468 and 470 are placed over the lower frame cross bar 378 and secured to cross bar 378 by screws. Holes or notches 480 adjacent one end of flanges 472 and 474 will be disposed above the aforedescribed apertures 440 in the cross bar 378 and permit passage of the control rod 434. A second set of holes or notches 482 are centrally located in flanges 472 and 474 and will align over apertures 484 in the center of cross bar 478. A dielectric plunger 486, with a head 488 disposed on the lower side of cross bar 478, projects up through the apertures 484 and holes 482 and serves as a starting switch actuator. The lower shroud flanges also overlap and are fastened together by screws, while the edges of the shrouds overlay and engage the frame legs 380.

A pronged electrical connector 490 is mounted on shroud 468 with the connecting prongs projecting exterior of the panel 64. Enclosed within the panel 64 is a double pole, double throw, spring biased, plunger actuated running switch 492. Switch 492 is secured to a bracket 494 welded to the under side of cross bar 478 and is positioned so its spring biased plunger 496 is engaged by and aligned with the lower end 438 of control rod 434. It is the spring biased position of switch 492 that holds the aforedescribed control rod 434 and knob 446 in the upper position under control levers 452.

Also mounted on the interior side of shroud 468 is a starting switch 498 with its spring biased plunger 500 disposed immediately below and aligned with the dielectric plunger 486. Starting switch 498 is a single pole "on-off" switch, spring biased to an "off" position. Depression of dielectric plunger 486 from exterior of panel 64 will place the switch in an "on" position.

The lines and circuits which interconnect the connector 490, switches 492 and 498 and the motor assembly will be fully described in a subsequent section of this specification, sufficient at this time is the fact that electric lines from inside the panel 64 are grouped into two cables 501 and 502. Each of cables 501 and 502 are secured to the inside of shroud 468 by clamps 504, and pass out of the lower corners of panel 464 below shroud support tabs 506. The cables 501 and 502 pass down the inside of the associated lower frame legs 380 being held thereto by clip fasteners 508 and then pass through side holes 510 in the motor housing 58. The ends of leads in each of cables 501 and 502 are appropriately connected to the motor 72, transformer 76 or rectifier 78 as will be later described with reference to FIGURE 5.

A two wire electric cable 514 (FIGURE 4) passes through one of the handle bars 430, through upper tubular member 422, into lower tubular member 416, out through an inside hole 516 in the lower member just above the panel 64 and terminates in a female connector plug 518 (FIGURE 1) which connects over the pronged connector 490 in the panel 64. Although it is desired for production reasons that cable 514 be spliced just below the telescoped connections 418 and 420 during initial assembly, the cable 514 could be run completely through the telescoped handle and a removable plug secured on the end in place of molded plug 518. Clearly shown in FIGURE 4 the upper length of two wire cables terminates in a heavy molded rubber strain relief extension member 520 which has a three pin plug connector 522 for attachment to an electric power line.

Suitable handle grips 548 and 549 are placed over the ends of handle bars 520, grip 549 covering the end portion 540 of splint 538.

*Electric motor and circuits*

That phase of this invention encompassing the motor control and regenerative-dynamic braking circuitry and providing dual safety factors of a "Dead Man" running switch and an overload cut-out is not restricted to capacitor start motors but includes all types of induction motors whose electrical design will permit use of regenerative braking. As is known, regeneration in an induction motor is the ability of the induction motor to operate as an induction generator, and occurs only when there is a leading phase component of current. One way of obtaining the leading phase component of current is through a suitable capacitor. In capacitor start motors, the capacitor is already present and in other induction motors a capacitor can be furnished. The braking effect of regeneration occurs because of circulating currents in both the primary and secondary windings of the motor. While regenerative braking is very effective at high speeds, it has very little effect at low speeds. Because of the latter undesirable characteristic, this invention proposes the use of dynamic direct current braking, employed in combination with regenerative alternating current braking. Dynamic braking can be obtained in an induction motor by applying direct current to either or both primary windings. This braking method is effective over the entire speed range of the motor, however, to keep the D.-C. power supply requirement at a low value to decrease component cost and size, this invention uses dynamic braking only in the lower speed range, relying upon regenerative braking in the higher speed range. A low cost transformer and selenium rectifier are used in this mower with appropriate switches in the circuitry to supply the necessary D.-C. This combination A.-C., D.-C. braking can be achieved by various circuits, several of which are disclosed hereinafter.

Figure 5:
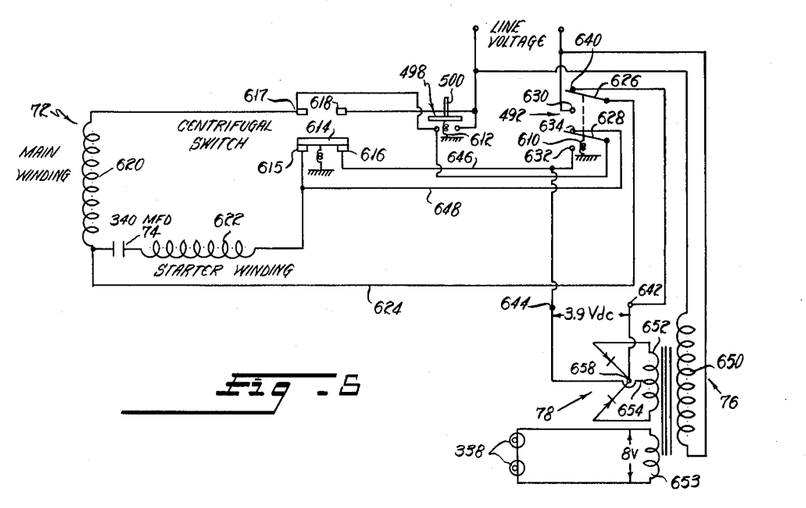
FIGURE 5 is a schematic diagram illustrating the components and circuitry used for the electric motor control and providing safety features to start and stop the motor combined with regenerative-dynamic motor braking.

With reference particularly to FIGURE 5, a schematic diagram of the electrical circuit as used in the lawn mower is illustrated. Previously designated switch 492 is a double pole double throw switch normally biased as by spring 610 to its illustrated "non-run" position. As is clearly shown in FIGURE 4, switch 492 is the "Dead Man" switch actuated by hand levers 454 through push rod 434 and must be held in an "on" position to permit the motor to start or to continue running once started. Switch 498 is a foot operated switch which is biased as by spring 612 to its normally open position, and is closed only during the starting cycle.

Contactor 614 is the movable element in a centrifugal switch which in this embodiment is the conventional speed responsive switch used in a capacitor start induction motor and is adjusted to transfer from start contacts 615 and 616 to running contacts 617 and 618 at a speed of approximately 600 r.p.m. The induction motor 72 comprises a main winding 620 and the auxiliary starter winding 622 with series capacitor 74.

The junction between main winding 620 and starter winding 622 at capacitor 74 is connected by lead 624 to blade 626 of the hand operated running switch 492. The other lead to main winding 620 extends from contact 617 of the centrifugal switch to blade 628 of running switch 492.

One side of the line voltage is connected directly to contact 630 associated with blade 626 so that when running switch 492 is transferred, one side of the line directly connected through lead 624 to the common junction between motor windings 620 and 622. The other side of the line voltage is connected directly to terminal 618 of the centrifugal switch so that once contactor 614 transfers to contacts 617 and 618, line voltage is supplied across main winding 620. At speeds up to about 600 r.p.m. contactor 614 is in its illustrated position and hence the line connection to contact 617 during the starting cycle is through switch 498 which is held closed by the operator's foot until the centrifugal switch is actuated.

Actuation of foot operated switch 498 connects the other side of the line voltage to blade 628 of switch 492. When switch 492 is closed to its non-illustrated position, the circuit energizing starter winding 622 is completed from contact 632 through contacts 616 and 615 of the centrifugal switch and back through lead 624 and blade 626 to contact 630 of switch 492. Thus, simultaneous actuation of both the hand controlled switch 492 and the foot controlled switch 498 is necessary before the motor can be started. Once the motor speed reaches approximately 600 r.p.m. contactor 614 of the centrifugal switch transfers, and it is no longer necessary to hold foot operated switch 498 closed as power is supplied to the main winding 620 through contacts 618 and 617 and starter winding 622 becomes de-energized.

Once the motor reaches operating speed, it continues running until either it is overloaded to the extent that its speed reduces below the drop-out speed of the centrifugal switch whereby contactor 614 drops back to contacts 615 and 616 and the circuit is interrupted at contact 618 or until hand controlled switch 492 is released to return to its illustrated position. When switch 492 is transferred to its illustrated position, switch blade 626 transfers from contact 630 and thus breaks the circuit from the input power regardless of whether foot operated switch 498 is closed to remove the electrical power input to the motor.

When blade 628 of switch 492 is on contact 634, the main winding 620 and starter winding are in parallel whereby regeneration braking is obtained due to the action of capacitor 74 producing a leading phase component of current. The regenerative braking effect is the result of losses occurring in the motor because of the circulating currents in both of the motor windings which at this period are connected across each other. While the regenerative braking thus obtained is quite effective at high speeds, its effectiveness reduces markedly at slower speeds.

To produce effective braking at slower motor speeds, circuit connections are provided to supply a D.-C. current through main winding 620 by means of a circuit including lead 624, blade 626 and contact 640 of switch 492 to one terminal 642 of a D.C. voltage source and from the other D.C. voltage terminal 644 to lead 646, contacts 616 and 615 and the contactor 614 of the centrifugal switch, lead 648, contact 634 and blade 628 of switch 492, and contact 617 to the upper side of motor winding 620. The dynamic braking effect is the result of losses in the motor windings caused by the current generated in the rotor windings due to the rotor conductors cutting the magnetic field set up by the direct current in the main winding 620. Dynamic braking is, of course, effective over the entire speed range, but in order to keep the D.C. power supply and associated circuit components of small size and inexpensive, the dynamic braking is used only at lower speeds and is made effective only after contactor 614 of the centrifugal switch transfers to contacts 615 and 616.

While any suitable source of D.C. voltage may be used, in the lawn mower described the D.C. voltage is obtained from a small transformer 76 having a primary winding 650 directly connected across the input power lines and two secondary windings 652 and 653. Secondary winding 652 contains a center tap 654 which is connected directly to terminal 644 and the end connections of secondary winding 652 are connected through the elements of rectifier 78 to a common junction 658 which is connected to terminal 642. The rectifier elements are preferably of the dry disc type and since the D.C. voltage is only approximately 3.9 volts, the D.C. current amounts to no more than 3 or 4 amperes.

It may be noted that anytime the electrical cord on the lawn mower is connected to the electrical power lines transformer 76 is energized and light bulbs 338 connected across secondary winding 653 will be energized. Also, so long as hand-operated switch 492 is left in its illustrated spring biased position and centrifugal switch contacts 614 are in the illustrated position, the D.C. voltage providing dynamic braking is applied to main winding 620 of motor 56.

Summarizing the operation of the circuit, one side of the line voltage is applied through foot-operated switch 498 to terminal 617 and main motor winding 620 and to terminal 632 and blade 628 of hand-operated switch 492 and contacts 616 and 615 of the centrifugal switch to starter winding 622. The other side of the line is applied through contact 630 and blade 626 of the hand-operated switch and lead 624 to the common junction of the motor windings. When the motor speed reaches about 600 r.p.m., contactor 614 transfers to thereby disconnect starter winding 624 from the circuit and connect the one side of the line from contact 618 directly to winding 620 of the motor through contact 617. Foot-operated switch 498 is by-passed and remains completely ineffective so long as the motor is running above the drop out speed.

Terminal 644 of the D.C. power supply is connected through contact 632 and blade 628 to contact 617 on one side of A.C. line to therefore provide a common reference potential. Terminal 642 of the D.C. power supply is, however, connected only to terminal 640 of switch 492 and consequently the rectifiers are fully protected from the motor circuit until slow speeds are reached.

The mower motor is ordinarily turned off by hand-operated switch 492 transferring to its illustrated non-running position and foot-operated switch 498 is in its illustrated position. When switch 492 transfers, the circuit to the main motor winding is disconnected from the power line at contact 630; starter winding 622 with capacitor 74 is connected in parallel with winding 620 through a circuit including lead 648, contact 634 and blade 628 of switch 692 and terminal 617 whereby a circulating A.C. current having a leading current phase is developed to produce regenerative braking. Until the motor speed has reduced to the drop out speed of the centrifugal switch, the D.C. power source is disconnected from the motor windings since the circuit from D.C. supply terminal 644 is broken between contacts 616 and 615 of the centrifugal switch. This protects the rectifiers from the high A.C. voltage present in the motor during the regeneration braking period. When contactor 614 bridges contacts 615 and 616 the D.C. voltage is applied to main winding 620 from contact 615, lead 648, contact 634 and blade 628 of switch 492 to contact 617 and through lead 624, arm 626 and contact 640 of switch 492 to the D.C. supply thereby applying the dynamic braking effect. This circuit is designed so that so long as the motor is plugged in and not running there will be a very low D.C. voltage on the main motor winding 620. This, however, constitutes no hazard since the current flow is so small that there is no overheating of the motor.

There is provided by this circuit an effective and fully automatic electrical braking system which uses the conventional items in a capacitor start motor and only inexpensive stock electrical components, which occupy little space, require no maintenance and have long life, and consume inconsequential quantities of power.

The improved combination regenerative and dynamic braking system can also be embodied in other circuits which for some uses, and particularly those apart from the lawn mower field, may be more convenient when only a single control switch is provided. The circuits of FIGURES 6, 7 and 8 each provide regenerative braking at high speeds when the source of power is first disconnected from the motor and dynamic braking when the motor speed reduces to the point when the centrifugal switch recloses.

Figure 6:
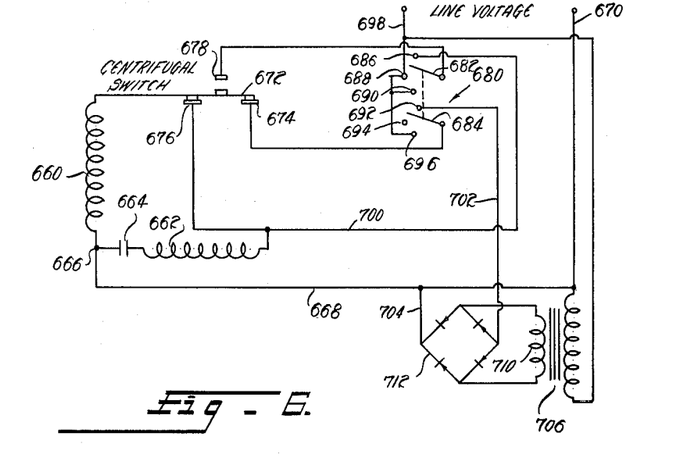
FIGURES 6, 7 and 8 are schematic diagrams illustrating alternate forms of circuitry and control which can be used in lieu of the circuit in FIGURE 5 and which incorporate safety features and regenerative-dynamic motor braking.

Referring now to FIGURE 6, the motor comprises a main winding 660, a starter winding 662 and capacitor 664 connected together at a common junction 666 and connected by lead 668 to terminal 670 of the input A.C. power line. The centrifugal switch has an inertia controlled contactor 672 which is in contact with terminals 674 and 676 at low speeds and in contact with terminal 678 at speeds greater than its transfer speed.

Switch 680 has two blades 682 and 684 which are ganged together for movement across terminals 686, 688 and 690, and 692, 694 and 696 respectively. Blades 682 and 684 are in the "off" position when in contact with terminals 686 and 692 respectively, in the "run" position when in contact with terminals 688 and 694 respectively, and in the "start" position when in contact with terminals 690 and 696 respectively. Terminals 688, 690 and 696 are connected to terminal 698 of the input A.C. power line. Terminal 694 is unused, not being connected to any circuit component. Terminal 686 is connected by lead 700 to the starter winding and to terminal 676 of the centrifugal switch and blade 682 is connected to terminal 678 of the centrifugal switch. Terminal 692 is connected by lead 702 to one side of the D.C. power supply while the other side of the D.C. power supply is connected to lead 668. Blade 684 is connected to terminal 674 of the centrifugal switch.

Transformer 706 has its primary winding 708 connected across the input A.C. power lines 670 and 698, and its secondary winding 710 connected to a conventional full wave rectifier bridge 712.

To start the motor, switch 680 must be moved to its "start" position where blades 682 and 684 contact terminals 690 and 696 respectively, whereby power is applied from input terminal 698 to terminal 696 and blade 684 of switch 680, and from terminals 674 and 672 of the centrifugal switch to main winding 660 and from terminal 676 through starter winding 662. In this embodiment junction 666 on the other side of the motor is permanently connected to terminal 670 of the A.C. input power supply.

After the motor speed increases and contactor 672 transfers to contact 678, switch 680 may be moved to its middle or "run" position where it stays until the motor is to be turned off. Switch 680 is preferably constructed to have stable positions at "run" and "off" and to be turned to the "start" position only against a spring bias. Hence, once the motor has attained its operating speed, the switch is released to its "run" position. In the "run" position, power from terminal 698 of the power supply is connected from terminal 688 and blade 682 of switch 680 to terminals 678 and 672 and to motor winding 660. No power is supplied to starter winding 662 after contactor 672 of the centrifugal switch transfers.

If the motor is overloaded to the extent the centrifugal switch transfers, no A.C. power is supplied to either winding and the motor therefore rapidly comes to a stop due to the overload condition.

If switch 680 is moved to its "off" position, the circuit from input supply terminal 698 is interrupted. Switch blade 682 contacting terminal 686 then establishes a circuit connection from main winding 660 through contacts 672 and 678 of the centrifugal switch and lead 700 to starter winding 662 whereby a circuit providing regenerative braking is provided. When the motor speed reduces so that contactor 672 transfers to contact terminal 674 of the centrifugal switch, then a circuit is completed for supplying D.C. across main winding 660 through lead 668, lead 704 to one terminal of rectifier bridge 712, and from the other terminal of the rectifier bridge through lead 702, terminal 692, blade 684 and terminal 674 and contactor 672 of the centrifugal switch.

The circuit of FIGURE 6 as well as the circuit of FIGURE 5 incorporates the safety feature of a special start position, in other words, merely turning the operator's switch 680 to a "run" position is inadequate to start the motor. Hence any time the motor speed has been greatly reduced, as for example due to an overload, the motor is removed from the line and cannot be restarted until the operator deliberately moves his switch to the special "start" position. Also the motor is decelerated to a standstill quickly by means of first, the regenerative braking and subsequently, after the centrifugal switch recloses, by dynamic braking; and the D.C. circuit components are protected against the large magnitude alternating voltages and currents by being disconnected from the motor circuit during starting and during stopping until low motor speeds are reached.

Figure 7:
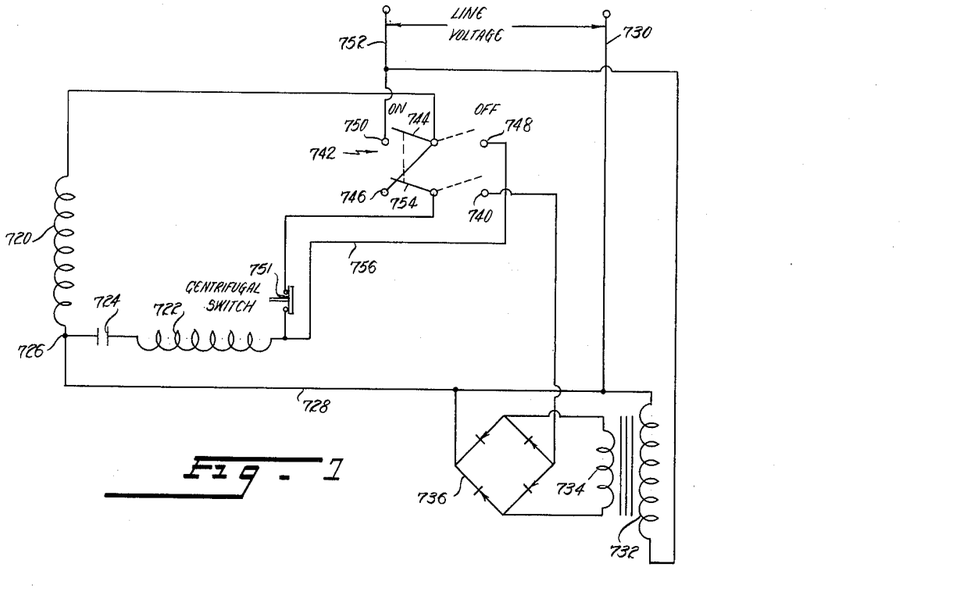

FIGURE 7 is a further embodiment of a circuit incorporating the combination regenerative and dynamic braking. Here the main motor winding 720, starter winding 722, capacitor 724 and the connection of the common junction 726 by lead 728 to terminal 730 of the input A.C. power supply are all the same as in FIGURE 6. The transformer primary 732 is connected across the A.C. input and its secondary 734 is connected to a full wave rectifier bridge 736, one terminal of which is connected to lead 728 and the other to terminal 740 of switch 742. Switch 742 is a DPDT switch having an internal connection from blade 744 to terminal 746, a connection from terminal 748 to starter winding 722, and a connection from terminal 750 to one side 752 of the A.C. input line.

The centrifugal switch 751 in this embodiment may be of the type conventionally used in capacitor start motors since it carries only one set of normally closed contacts which are adapted to open when the motor reaches a predetermined speed and close anytime the motor speed reduces below the reclosing speed.

When switch 742 is turned to its "on" position, power is applied from input terminal 752 through terminal 750 and blade 744 of switch 742 to main winding 720 and from blade 744 to terminal 746 and blade 754 of switch 742 and centrifugal switch 751 to starter winding 722. By the time operating speed is reached, centrifugal switch 751 will have opened thereby de-energizing the starter winding 722.

When the motor is stopped by turning switch 742 to its "off" position, main winding 720 is connected to starter winding 722 through blade 744 and terminal 748 of switch 742 to thereby provide the regenerative braking effect resulting from circulating alternating currents. The D.C. voltage is applied from rectifier bridge 736 through lead 728 to one side of the main winding 720 and from terminal 740 and blade 754 of switch 742 to the centrifugal switch 751 and back through lead 756 to terminal 748 and blade 744 of switch 742 to main winding 720. Thus, after the motor speed has been reduced to the reclosing speed of the centrifugal switch 751, the D.C. braking voltage is automatically applied to main winding 720 to thereby provide dynamic braking and rapid stopping of motor.

Figure 8:
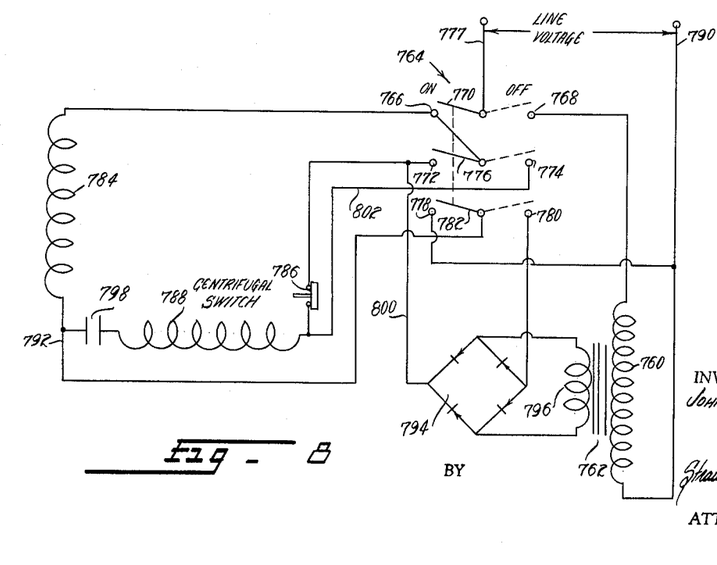

Referring now to FIGURE 8, the circuit is identical in operation to the circuit shown in FIGURE 7 except that the primary winding 760 of transformer 762 is energized only when switch 764 is in the "off" position. Switch 764 is a 3 PDT type having terminals 766 and 768 associated with blade 770; terminals 772 and 774 associated with blade 776; and terminals 778 and 780 associated with blade 782.

Terminal 766 is connected to the main motor winding 784 and terminal 768 is connected to one side of the primary winding 760 whereby transformer 762 and the main motor winding 784 are never simultaneously energized from the A.C. input line. Terminal 766 is also connected to blade 776 so that when switch 764 is in the "on" position, one side 777 of the A.C. input line is connected from terminal 772 through centrifugal switch 786 to starter winding 788. The starter winding is also connected to terminal 774 so that when switch 764 is in the "off" position, starter winding 788 will be connected across the main winding 784 to produce the regenerative braking action.

Terminal 778 is connected to terminal 790 of the A.C. input and blade 782 is connected to the common winding junction 792 in the motor to thereby complete the circuit supplying A.C. power across main motor winding 784. Terminal 780 of switch 764 is connected to one side of the full wave rectifier 794 which is supplied with a low D.C. voltage from secondary winding 796 of transformer 762.

When switch 764 is turned to the "on" position, power is supplied from input terminal 777 to blade 770 and terminal 766 to main motor winding 784 and from junction 792 through switch blade 782 and terminal 778 to the other A.C. input terminal 790. The starter winding 788 is also energized through the circuit extending from terminal 766 to blade 776 and terminal 772 of switch 764, the closed contacts of centrifugal switch 786 and to junction 792. Energization of the starter winding 788 is interrupted when centrifugal switch 786 opens as the motor accelerates and the motor then operates while transformer 762 remains de-energized.

When the switch 764 is thrown to the "off" position the motor is disconnected from both sides 777 and 790 of the input line since switch blades 770 and 782 are transferred to terminals 768 and 780 respectively. With switch blade 770 in contact with terminal 768, the primary of transformer 762 is energized to thereby produce the D.C. voltage in rectifier bridge 794. The auxiliary starter winding 788 and capacitor 798 are connected in parallel with the main winding 784 through a circuit including switch terminal 766, blade 776 and terminal 774 with the result that regenerative A.C. braking occurs immediately and the rotor speed of the motor is reduced.

One terminal of the D.C. power source is connected by lead 800 to centrifugal switch 786 while the other lead is connected directly to terminal 780. Terminal 780 is connected by blade 782 to junction 792 on one side of main winding 780 while the circuit from the other side of the D.C. power supply from lead 800 is through centrifugal switch 786, lead 802, terminal 774, blade 776 and terminal 766 of switch 764. Thus, as long as motor speed is above the centrifugal switch closing speed, no direct current will flow through main winding 784. This protects the rectifier bridge 794 from high A.C. voltage occurring on the main winding during regenerative braking to thereby make possible the use of dry rectifiers such as selenium or copper oxide. When centrifugal switch 786 closes, the D.C. voltage is impressed on main winding 784 with the result that dynamic braking is effected and the rotor speed is quickly reduced to standstill.

While the foregoing circuits, illustrating the combination regenerative and dynamic braking, are all described in connection with capacitor start motors, they are adaptable to any type of induction motor as the starter winding and capacitor could be replaced by any other suitable load circuit providing a leading phase current. The electrical components for the described systems are standard items and consequently inexpensive. The combination regenerative A.C. and dynamic D.C. braking system requires no maintenance, is readily usable on portable apparatus, consumes very low power and occupies very little space. These circuits are therefore well adapted for use with electric lawn mowers and other types of power tools where quick stops are important to operator safety and where the expense, size or weight of the more elaborate systems would be economically prohibitive on items which are priced to meet the average homeowner market.

Considering all of the foregoing factors including the detailed description of the illustrated embodiment, there has been disclosed a power mower with novel safety control features including automatic electric motor braking circuits.

For starting safety, novel circuitry has been conceived for an electric motor so the mower can be started only when a handle control is held and a starting button depressed. The starting button is placed a sufficient distance from the handle control so it can be depressed with the operator's toe and a person cannot inadvertently start the mower while any of his extremities are under the housing. The circuit incorporates a novel automatic electric brake which stops the blade in three seconds upon release of handle control, making it safer when mowing terraces and steep slopes. Should the motor drop below cutting speed due to moving too rapidly into extremely dense turf, the motor will cut out. This assures that the mower never operates at too low a cutting speed. A touch of the toe will re-start at proper cutting speed. The mower will start on grass by merely actuating two switches which eliminates the need to start on sidewalk or drive. Mowing lights are included to indicate power is applied to the motor circuit and to permit mowing after dark on short fall evenings or in the cool of a summer evening.

The electric powered mower embodiment has certain advantages over gasoline power rotary mowers. There is no starting problem because the capacitor start electric motor has a high torque starting rotation whereas many gasoline rotary mowers cannot be started on grass areas because the friction of the grass on the cutter blades will not permit sufficient rotational speed to start the engine. It is not possible to incorporate the safety features of the electrical brake and dual switch starting of this invention on gasoline engine powered mowers. Electric motors do not require the overhauling and maintenance of gasoline engines. An electric mower is silent as compared to a gasoline engine mower and does not emit fumes and odors of combustion products into the air. Since home type gasoline power mowers provide no source of electric power they do not have lights for night mowing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electric motor powered mower comprising: mower blade means; an induction motor connected to drive said blade means; a braking circuit for said induction motor comprising means operative when the alternating current input power to the motor is removed for enabling alternating current regenerative braking of the motor, and means operative only at low motor speeds and with the alternating current input power to the motor removed for enabling dynamic braking.

2. An electric power mower comprising a wheeled frame; cutting mechanism; an electric induction motor mounted on said frame and connected to said cutting mechanism; motor control components and circuitry connecting said components to said motor and adapted to be connected to A.C. power, said components and circuitry incorporating safety starting and stopping functions, and comprising starting and running control components and circuitry and regenerative A.C.-dynamic D.C. motor braking circuitry rendered automatically sequentially operative upon opening of said running control circuitry during motor operation.

3. An electric power mower as defined in claim 2, wherein said control components and circuitry include an overload control component and circuitry that opens said running circuit and disenables the running control circuitry independently of operation of normal running control components.

4. An electric mower comprising a wheeled frame, cutting mechanism and a split phase capacitor start electric motor on said frame drive connected to said cutting mechanism; a control for said mower motor comprising a dual switch starting circuit, one switch of which and an associated circuit comprises a running circuit, a motor centrifugal switch in said starting circuit and said running circuit, a transformer and rectifier with associated circuitry through said running switch and said centrifugal switch to provide with said split phase operation, sequential regenerative A.C. and dynamic D.C. motor braking rendered operative automatically upon opening of said running circuit by said running switch during motor operation.

5. A braking circuit for an induction motor comprising means operative when the alternating current input to the motor in operative rotary condition is removed for initially enabling regenerative braking of the motor solely by regenerative alternating current, and means operative only at low motor speeds providing a source of direct current independent of said regenerative alternating current and with the alternating current input power to the motor removed for enabling direct current dynamic braking.

6. A braking circuit for an induction motor comprising: an impedance having a power factor such that the current leads, in phase, the voltage; means operative when the alternating current input power to the motor in operative rotary condition is removed to connect said impedance across the main motor winding to produce regenerative braking of the motor solely by regenerative alternating current; a source of substantially constant direct current power; and means operative only at low motor speeds for connecting said direct current power source to said main winding to produce direct current dynamic braking independent of said regenerative alternating current.

7. In combination with an induction motor of the type having a main winding, a starting winding, a capacitor and a speed responsive switch having contacts which are open at normal operating speeds and closed at lower speeds; an electrical switch having a first terminal connected when said electrical switch is in a first position for controlling the application of input power to the motor; contacts including a second terminal on said electrical switch for connecting said starting winding and capacitor across the main motor winding when the input power is removed from the main motor winding; a source of direct current power; and means applying said direct current power to said main motor winding through said contacts on the speed responsive switch.

8. In combination: an induction motor having a main winding; a starting circuit including a starting winding and capacitor connected to one end of said main winding; a speed responsive switch having a set of contacts closed at low motor rotor speeds, open at rated motor speed and adapted to transfer at a predetermined intermediate motor speed; a source of alternating current; a first circuit including switching means for energizing said starter winding through said set of contacts on said speed responsive switch and for energizing said main winding in parallel with said starter winding and capacitor from said source of alternating current; a source of direct current, a second circuit including said switching means for simultaneously disconnecting said main winding from said source of alternating current, connecting said starting circuit across said main winding and connecting said source of direct current across said main winding through said set of contacts on said speed responsive switch.

9. The combination as defined in claim 8, wherein said speed responsive switch contains a second set of contacts open when said previously mentioned set of contacts is closed and closed when said previously mentioned set of contacts is open and circuit means for energizing said main winding from said source of alternating current through whichever of said sets of contacts is closed.

10. In combination with an induction motor having a main winding, a circuit including a capacitor, a speed responsive switch, a multiple pole double throw switch having a first pole connected to one end of said main winding and adapted to be movable between first and second contact terminals, a circuit connection from one side of the motor supply voltage source to said first pole when said double throw switch is in a position to apply operating power to said motor and said motor is operating at rated speed; means connecting one of said contact terminals to said circuit including the capacitor and to one terminal of said speed responsive switch; a source of direct current; circuit means including said multiple pole switch for connecting said source of direct current across said main winding through said speed responsive switch when said first pole is connected to said one of said contact terminals whereby said direct current is applied to said main winding only at low motor speeds and when the motor supply voltage is disconnected from said main winding.

11. In combination with an induction motor having a main winding; a starting circuit including a capacitor and a starting winding; said starting circuit having one terminal connected to one terminal of said main winding; a speed responsive switch having two sets of contacts and a contactor to open one set and close the other set of said contacts as a function of motor speed; means connecting a first contact of said one set of contacts on said speed responsive switch to the other terminal of said starting circuit; a double pole double throw switch having one pole connected to the other terminal of said main winding; a first contact terminal associated with said one pole connected to said first contact of said speed responsive switch to thereby connect the other terminal of said main winding to said other terminal of said starting circuit; a second contact terminal associated with said one pole connected to said second contact of said first set of contacts on said speed responsive switch; a manually operable start switch spring biased to an open circuit condition; circuit means connecting one side of the operating power supply through said start switch to said one pole of said double pole double throw switch; a circuit connection between said one side of the operating power supply and said second set of contacts on said speed responsive switch to provide operating power to said other terminal on said main winding through a circuit containing said second set of contacts on said speed responsive switch in parallel with said start switch; means for connecting said one terminal of said main winding to the other pole of said double pole double throw switch; and means for connecting a contact terminal associated with said other pole to the second side of said operating power supply.

12. The combination as defined in claim 11, further comprising a source of direct current power having a first terminal connected to a second contact terminal associated with said other pole of said double pole double throw switch; and a second terminal on said direct current power supply connected to said second contact of said first set of contacts on said speed responsive switch to thereby provide direct current dynamic braking at low motor speeds.

13. In combination with an induction motor having a main winding; a starting circuit comprising a capacitor and a starting winding; said starting circuit having one terminal connected to one terminal of said main winding; a speed responsive switch; a first contact on said speed responsive switch connected to the other terminal of said starting circuit; a double pole double throw switch having one pole connected to the other terminal of said main winding; means connecting a first contact terminal associated with said one pole to a first contact of said speed responsive switch to thereby provide a circuit connection between the other terminal of said main winding and said other terminal of said starting circuit; a second contact terminal associated with said one pole connected to one side of the operating power supply; means connecting the other contact of said speed responsive switch to the other pole of said double pole double throw switch; means for connecting a contact terminal associated with said other pole to said one pole; and means connecting said one terminal of said main winding to the other side of said operating power supply.

14. The combination as defined in claim 13, further comprising a source of direct current power having a first terminal connected to said one terminal of said main winding; and circuit means connecting a second contact terminal associated with said other pole of said double pole double throw switch to the other terminal of said direct current power source.

15. In combination with an induction motor having a main winding; a starting circuit including a capacitor and a starting winding; said starting circuit having one terminal connected to one terminal of said main winding; a speed responsive switch; means connecting one side of said speed responsive switch to the other terminal of said starting circuit; a double pole double throw switch having a first pole connected to the other terminal of said main winding; a pair of contacts associated with said first pole connected to opposite sides of said speed responsive switch; a source of direct current having one terminal connected to the second side of said speed responsive switch; means connecting said second pole of said double pole double throw switch to said one terminal of said main winding; a pair of contacts associated with said second pole; one of said last mentioned pair of contacts being connected to one side of the alternating current power line and means connecting the other of said last mentioned pair of contacts to the other terminal of said direct current power source.

16. The combination as defined in claim 15, wherein said source of direct current power comprises a step down transformer having a dry rectifier bridge connected across a secondary winding of said transformer, and means for energizing said transformer from said alternating current power line.

17. The combination as defined in claim 16, having a further switching device and means including said further switching device to alternately connect the other side of said alternating current power line to said other terminal of said main winding or to one terminal of said transformer.

18. An electric motor powered mower comprising: mower blade means; a split phase, capacitor start electric motor connected to drive said blade means; and motor control means with electric circuitry means on said mower including two plural position switches, both of which are spring biased to "off" position and both of which must be placed in "on" positions to start said motor, one of said switches being a running switch which must always be maintained in "on" position to retain the motor in running condition, and said electric circuitry including a regenerative A.C.-dynamic D.C. braking circuit rendered effective upon release of said running switch to cause said motor to come rapidly to a dead stop.

19. An electric motor powered mower comprising: mower blade means; an electric motor connected to drive said blade means; motor control means with electric circuitry means on said mower including a first and a second switch, both of which are constantly spring biased to "off" positions, said circuitry means enabling starting of said motor only when both of said switches are moved to and simultaneously held in the "on" position against spring bias, the first of said switches being a running switch; a portion of said circuitry means, including said running switch, being rendered operative to maintain said motor in running condition to the exclusion of the second of said switches responsive to maintenance of said running switch in "on" position after said motor is started; a mower handle bar manual control means; means operatively connected between said control means and said running switch, which control means must continually be manually held in position to maintain operation of said running switch in its "on" position against spring bias to maintain said portion of said circuitry means operative to retain the motor in a running condition, subsequent to starting of said motor; and said circuitry means further providing that movement of said running switch to its spring biased position will render said electric motor inoperative to resume operation solely by operation of said running switch.

References Cited by the Examiner

UNITED STATES PATENTS

| | | | |
|---|---|---|---|
| 2,050,180 | 8/1936 | Hurxthal | 310—62 |
| 2,265,443 | 12/1941 | McGuire | 16—110 |
| 2,511,160 | 6/1950 | Grobowski | 16—110 |
| 2,613,342 | 10/1952 | Thompson et al. | 318—211 |
| 2,680,829 | 6/1954 | Rhyne et al. | 318—201 |
| 2,702,448 | 2/1955 | Smith | 56—25.4 |
| 2,774,020 | 12/1956 | Griffes et al. | 318—203 |
| 2,818,539 | 12/1957 | Johnson | 318—212 |
| 2,938,323 | 5/1960 | Livingston et al. | 56—25.4 |

FOREIGN PATENTS 141,323  5/1951  Australia.

ABRAHAM G. STONE, *Primary Examiner.*

CARL W. ROBINSON, T. GRAHAM CRAVER,
*Examiners.*